(12) United States Patent
Hallum et al.

(10) Patent No.: US 6,774,637 B2
(45) Date of Patent: Aug. 10, 2004

(54) METHOD OF QUALIFYING AT LEAST A PORTION OF A FUEL CELL SYSTEM AND AN APPARATUS EMPLOYING SAME

(75) Inventors: Ryan Hallum, Latham, NY (US); Yaobang Wu, Latham, NY (US); Chris Comi, Scotia, NY (US); Prathap Haridoss, Watervliet, NY (US); Chockkalingam Karuppaiah, Troy, NY (US)

(73) Assignee: Plug Power, Inc., Latham, NY (US)

( * ) Notice: Subject to any disclaimer, the term of this patent is extended or adjusted under 35 U.S.C. 154(b) by 203 days.

(21) Appl. No.: 09/726,839

(22) Filed: Nov. 30, 2000

(65) Prior Publication Data

US 2002/0064694 A1 May 30, 2002

(51) Int. Cl.$^7$ .................. G01N 27/416; H01M 8/00
(52) U.S. Cl. .................. 324/433; 324/434; 429/13; 429/22
(58) Field of Search ................. 324/433, 434, 324/426, 443, 693, 71.1; 429/13, 17, 19, 22, 90; 205/337

(56) References Cited

U.S. PATENT DOCUMENTS

| | | | |
|---|---|---|---|
| 4,904,548 A | * 2/1990 | Tajima | 429/22 |
| 5,013,617 A | 5/1991 | Scheffler | 429/17 |
| 5,170,124 A | * 12/1992 | Blair et al. | 324/433 |
| 5,512,831 A | * 4/1996 | Cisar et al. | 204/228.1 |
| 5,605,770 A | 2/1997 | Andreoli et al. | 429/20 |
| 5,763,113 A | 6/1998 | Meltser et al. | 429/13 |
| 5,928,805 A | 7/1999 | Singh et al. | 429/13 |
| 5,945,229 A | 8/1999 | Meltser | 429/13 |
| 6,007,930 A | 12/1999 | Adams et al. | 429/13 |
| 6,063,516 A | 5/2000 | Grot et al. | 429/22 |
| 6,093,500 A | 7/2000 | Margiott et al. | 429/13 |
| 6,096,449 A | 8/2000 | Fuglevand et al. | 429/13 |
| 6,103,410 A | 8/2000 | Fuller et al. | 429/13 |

FOREIGN PATENT DOCUMENTS

| | | |
|---|---|---|
| JP | 58206071 | 12/1983 |
| JP | 07022047 | 1/1995 |
| JP | 08037013 | 2/1996 |

* cited by examiner

Primary Examiner—Albert Decady
Assistant Examiner—James C. Kerveros
(74) Attorney, Agent, or Firm—Heslin Rothenberg Farley & Mesiti P.C.; Victor A. Cardona, Esq (57) ABSTRACT

The present invention provides a method for enabling qualification of at least a portion of a fuel cell system. The method includes electronically obtaining at least one result of a test of the at least a portion of a fuel cell system and electronically comparing the at least one result to at least one qualifying criteria.

39 Claims, 5 Drawing Sheets

METHOD OF QUALIFYING AT LEAST A PORTION OF A FUEL CELL SYSTEM AND AN APPARATUS EMPLOYING SAME

TECHNICAL FIELD

This invention relates generally to fuel cells and more particularly to methods and apparatus for qualifying at least a portion of a fuel cell system.

BACKGROUND OF THE INVENTION

Fuel cells electrochemically convert fuels and oxidants to electricity and they can be categorized according to the type of electrolyte (e.g., solid oxide, molten carbonate, alkaline, phosphoric acid, or solid polymer) used to accommodate ion transfer during operation. Moreover, fuel cell assemblies can be employed in many (e.g., automotive to aerospace to industrial to residential) environments, for multiple applications.

A Proton Exchange Membrane (hereinafter "PEM") fuel cell converts the chemical energy of fuels such as hydrogen and oxidants such as air/oxygen directly into electrical energy. The PEM is a solid polymer electrolyte that permits the passage of protons (i.e., H+ions) from the "anode" side of a fuel cell to the "cathode" side of the fuel cell while preventing passage therethrough of reactant fluids (e.g., hydrogen and air/oxygen gases).

Usually, an individual PEM-type fuel cell assembly or stack has multiple, generally transversely extending layers assembled in a longitudinal direction. In the typical fuel cell assembly or stack, all layers which extend to the periphery of the fuel cells have holes therethrough for alignment and formation of fluid manifolds that generally service fluids for the stack. As is known in the art, some of the fluid manifolds distribute fuel (e.g., hydrogen) and oxidant (e.g., air/oxygen) to, and remove unused fuel and oxidant as well as product water from, fluid flow plates having fluid flow channels.

Before a fuel cell stack is qualified for use in a system to provide electrical power, it must be incubated or prepared for use, as is known by those of ordinary skill in the art. This process uses hydrogen, oxygen, carbon monoxide, carbon dioxide and/or nitrogen as a substitute or surrogate for reformate in the fuel cell stack. These gases are expensive to purify, store, and use in the amounts that this process requires.

Thus, there is a need for an efficient method and apparatus for qualifying fuel cell systems and portions thereof.

SUMMARY OF THE INVENTION

The present invention provides, in a first aspect, a method for enabling qualification of a fuel cell system. The method includes electronically obtaining at least one result of a test of at least a portion of the fuel cell system and electronically comparing the at least one result to at least one qualifying criteria.

The present invention provides, in a second aspect, an apparatus for enabling qualification of a fuel cell system. The apparatus includes a testing mechanism couplable to a computing unit and couplable to the fuel cell system. The testing mechanism is adapted to perform a test on at least a portion of the fuel cell system and the computing unit is adapted to control a testing mechanism, obtain a result of a test, and compare the result to a qualification criteria.

The present invention provides, in a third aspect, an apparatus for enabling qualification of a fuel cell system. The apparatus includes means for electronically obtaining at least one result of a test on at least a portion of the fuel cell system and means for electronically comparing the at least one result to at least one qualifying criteria.

The present invention provides, in a fourth aspect, an apparatus for enabling qualification of a fuel cell system. The apparatus includes a computing unit adapted to obtain at least one result of a test on at least a portion of the fuel cell system and a computing unit adapted to compare the at least one result to at least one qualifying criteria.

The present invention provides, in a fifth aspect, an article of manufacture including at least one computer usable medium having computer readable program code means embodied therein for enabling qualification of a fuel cell system. The computer readable program code means in the article of manufacture includes computer readable program code means for causing a first computing unit to obtain at least one result of a test on at least a portion of the fuel cell system and computer readable program code means for comparing the at least one result to at least one qualifying criteria.

The present invention provides, in a sixth aspect, at least one program storage device readable by a machine, tangibly embodying at least one program of instructions executable by the machine to perform a method of qualifying a fuel cell system. The method includes electronically obtaining at least one result of a test on at least a portion of the fuel cell system and electronically comparing the at least one result to at least one qualifying criteria.

BRIEF DESCRIPTION OF THE DRAWINGS

The subject matter which is regarded as the invention is particularly pointed out and distinctly claimed in the claims at the conclusion of the specification. The foregoing and other features, and advantages of the invention will be readily understood from the following detailed description of preferred embodiments taken in conjunction with the accompanying drawings in which:

DETAILED DESCRIPTION

In accordance with the principles of the present invention, a method for qualifying a fuel cell system or portion thereof and an apparatus for performing the method are provided.

Figure 1:
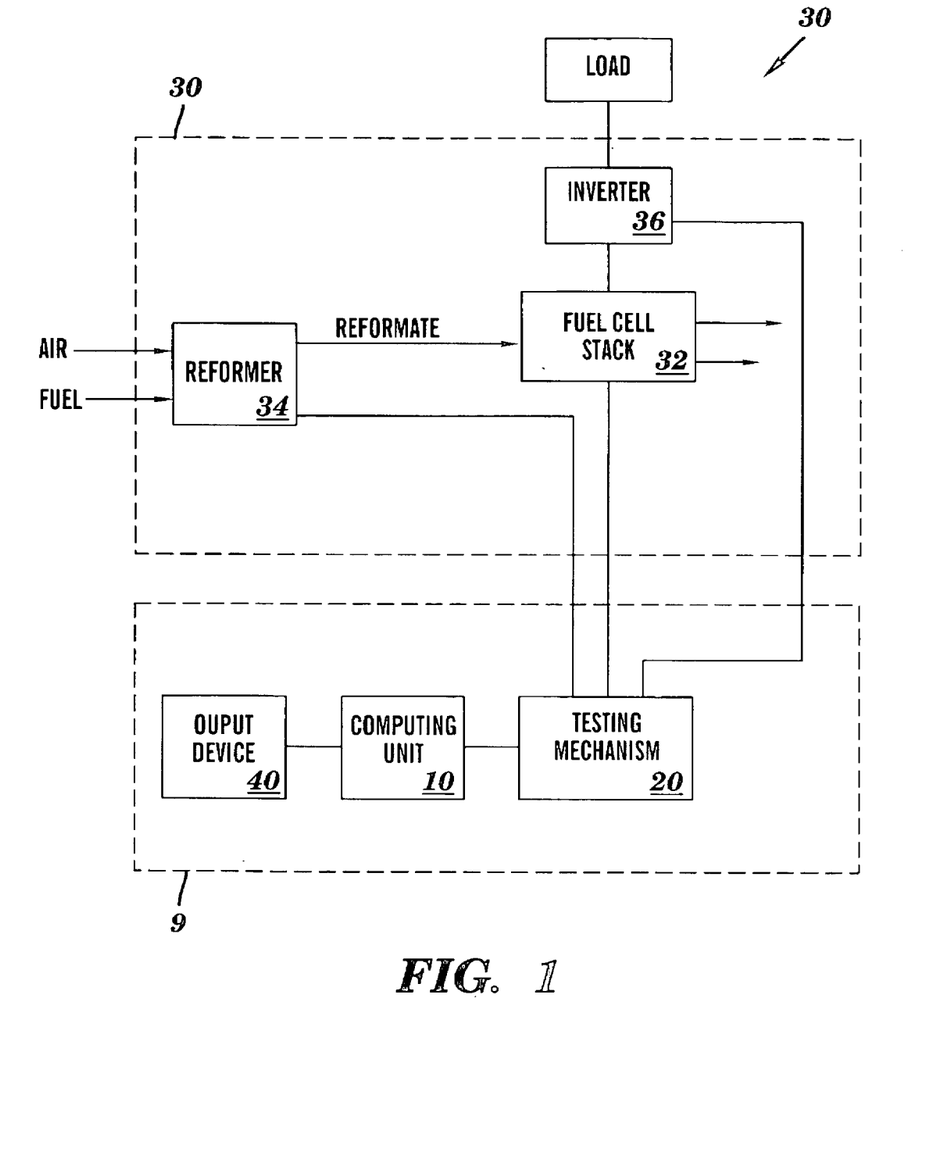
FIG. 1 is a block diagram of an apparatus for enabling qualification of a fuel cell system in accordance with the present invention.

In an exemplary embodiment depicted in FIG. 1, an apparatus 9 for qualifying a fuel cell system 30, or portions thereof, includes a computing unit 10 coupled to a testing mechanism 20 or a test station which is coupled to fuel cell system 30 or portions thereof Fuel cell system 30 may comprise an entire fuel cell system, including a fuel cell stack 32, fuel processor or reformer 34, an inverter 36, and various other components. Alternatively, a fuel cell system may include only a subset of the components of the fuel cell system, either individually or assembled into a subsystem. After the manufacture of various fuel cell system components, the testing mechanism is utilized to test the fuel cell system, or portions thereof, for various parameters to qualify it, or verify that it is functioning properly, such that it is suitable for use in a system for generating electrical power.

Prior to the initiation of the testing process, performance or qualification criteria are set for comparison to the results of various tests. These criteria might include various measurements of the performance of the fuel cell system and portions thereof. For example, regarding fuel cell stack 32, the criteria might include average fuel cell voltage drops for the stack, variations between voltage drops for individual cells, stack temperature, gas temperature or coolant temperature. Computing unit 10 may control testing mechanism 20 to conduct a test on fuel cell system 30 or a portion thereof, e.g., fuel cell stack 32. At the conclusion of the test, computing unit 10 electronically and desirably automatically obtains a result of the test, e.g., from various sensors (e.g., voltage readings, etc.), electronically and desirably automatically compares the result to the preset performance qualifying criteria for the particular test. Computing unit 10 might be a personal computer, such as a personal computer running Microsoft WINDOWS as the operating system, and based on Intel PC architecture. Computing unit 10 might also be a portion of a computer of this type, such as a microprocessor or other computing component capable of performing the requirements of the present invention.

After the comparison, the computing unit may output a message to an output device 40, such as a display screen for an operator to view. Such message may include indicating that the system or portion thereof has passed or failed a particular test. Alternate means of informing an operator could include lights or sound identifying a particular outcome or the printing of a report. If the test is passed, computing unit 10 may cause testing mechanism 20 to conduct a further test on fuel cell system 30 or a portion thereof. This process may be repeated until fuel cell system 30 has passed a series of tests resulting in it being qualified for use. Alternatively, fuel cell system 30 may fail to be qualified after one of the particular tests.

The above-described process is desirably used to qualify newly manufactured fuel cell components or fuel cell systems, but also could be used to ascertain the qualification of fuel cell systems or components already in service. For example, this process might be performed by coupling computing unit 10 via a communications network to testing mechanism 20, which might be at a location remote from computing unit 10. Computing unit 10 might then compare a result of a test on fuel cell system 30 or a portion thereof to predetermined criteria and determine whether fuel cell system 30 or a component thereof is still qualified. An indication regarding the comparison might be provided by computing unit 10 by coupling it to an output device at the remote location. This setup would allow a single computing unit at a central location to qualify a plurality of fuel cell systems or components thereof at various remote locations.

Figure 3:
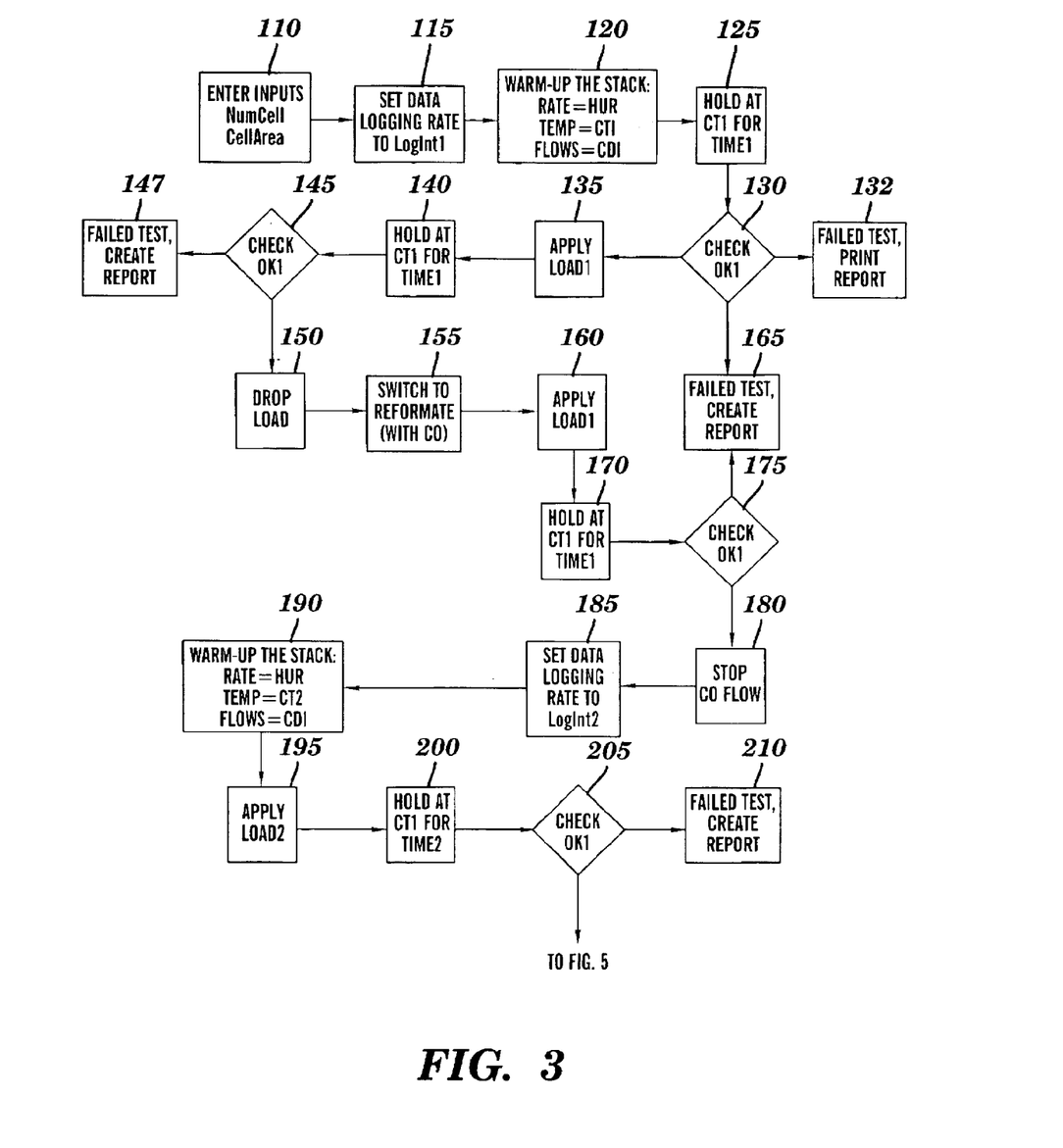
FIGS. 3–5 illustrate a flowchart of a method in accordance with the present invention for qualifying at least a portion of a fuel cell system of FIG. 1.
Figure 4:
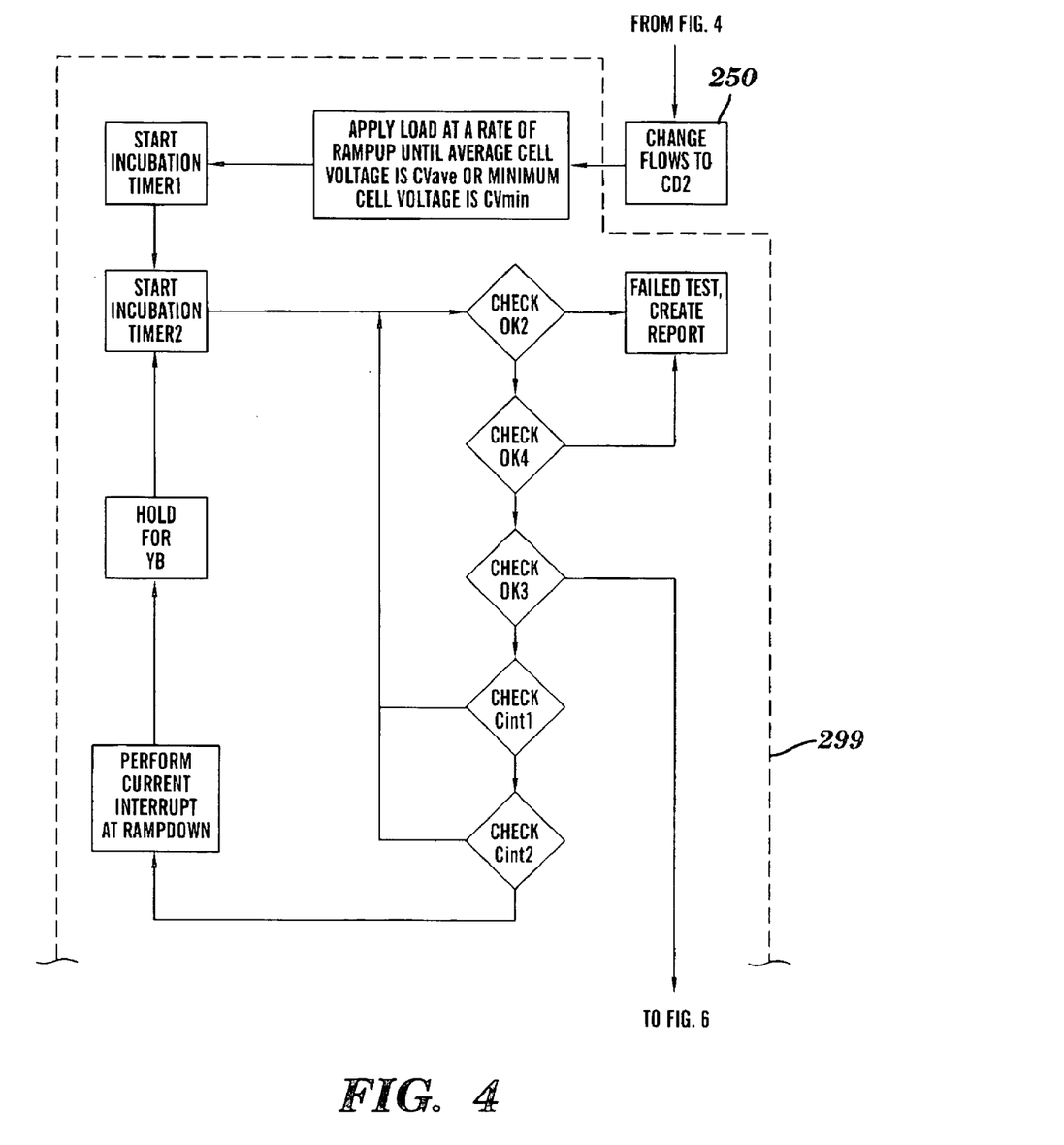
Figure 5:
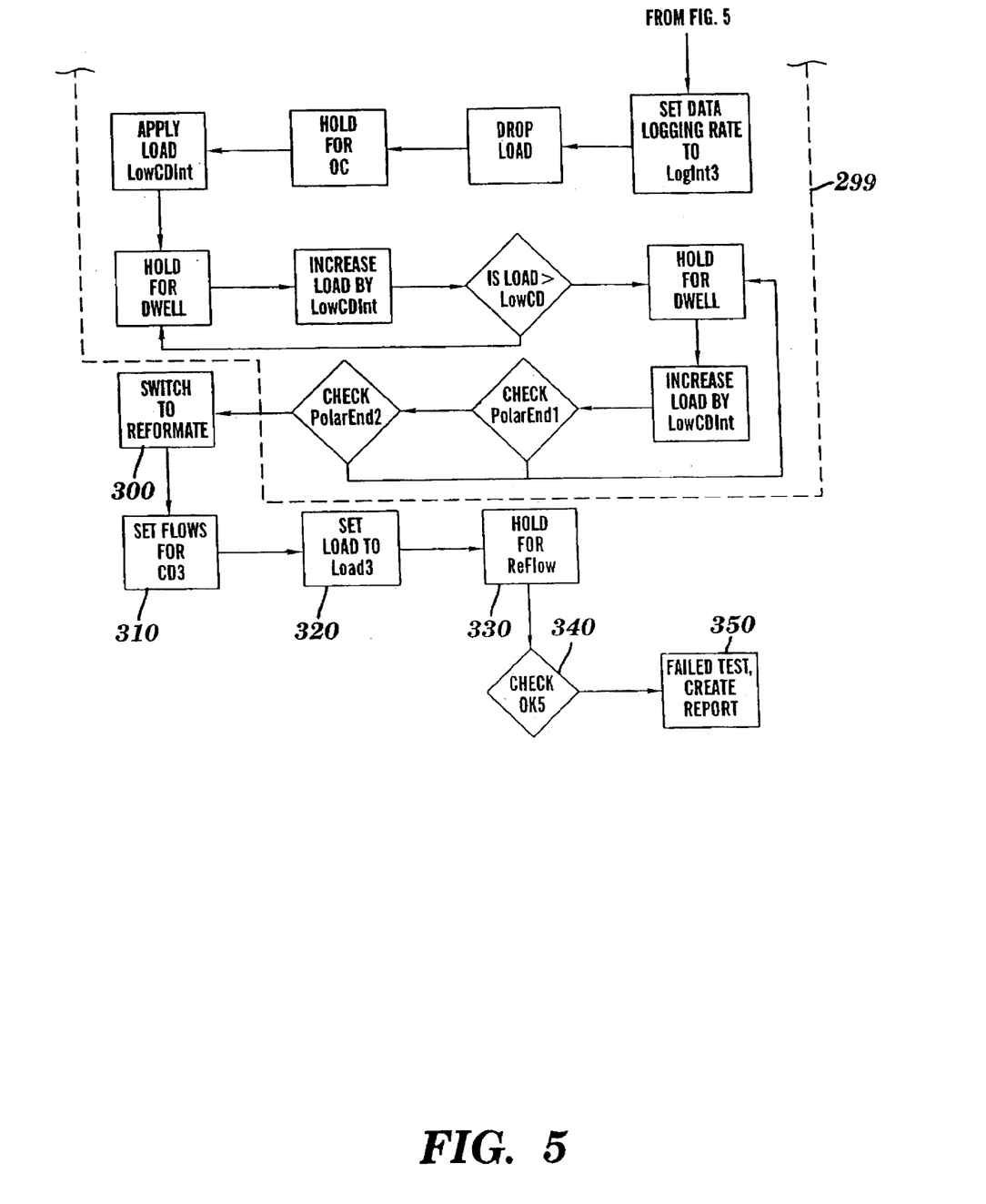

FIGS. 3–5 depict a flowchart which outlines one exemplary embodiment of a qualifying process of the present invention under which a fuel cell stack 32 (FIG. 1) of the fuel cell system 30 (FIG. 1) may be qualified or disqualified for use. It is desirable to disqualify a defective fuel cell stack as early as possible in the qualification process due to the expenses associated with the progressive tests involved in the process. This is particularly true of the expenses associated with purification, provision, and use of the reactant gases, i.e., hydrogen, oxygen, and carbon monoxide. Also, it is particularly desirable to avoid the expense of incubating a defective fuel cell stack by determining early in the process of its defective nature.

At Step 110, characteristics of the fuel cell stack to be tested are input into a computing unit such as computing unit 10 (FIG. 1) which may comprise a display screen with entry fields. The characteristics to be input could include the type of stack, e.g., a model number, qualification criteria, location of a database stored on or connected to computing unit 10 where qualification criteria might be found, flow rates of reactant gases, a desired temperature of reactant gases, or a desired temperature of coolant, among others. At Step 115, rates of data acquisition, or logging, to be performed by the testing mechanism are set. In Step 120, a mixture of hydrogen, nitrogen, and optionally carbon dioxide, serving as a surrogate for reformate produced by a reformer in full scale operation, and coolant are preheated and introduced into fuel cell stack 32 (FIG. 1). This mixture of gases may be referred to as surrogate reformate or reactant gases. The reformate and coolant might be preheated, for example, by a steam injection system.

The fuel cell stack is held at a temperature for a period of time in Step 125. An open circuit voltage test is then performed on fuel cell stack 32 (FIG. 1) to determine if the input or reactant gases are reaching all the fuel cells of fuel cell stack 32 (FIG. 1) in Step 130. An open circuit voltage test may comprise measuring voltage drops of the fuel cell plates in the stack, for example at a pin on each plate, when no load is being applied to fuel cell stack 32 (FIG. 1). Alternatively, voltage drops might be measured using a voltage monitoring system for a full cell stack, as described in U.S. patent application Ser. No. 09/629,548, entitled "VOLTAGE MONITORING SYSTEM FOR A FULL CELL STACK". The results of this test are compared by computing unit 10 (FIG. 1) to the predetermined criteria, input at Step 110, for example. The criteria might require that the difference between fuel cell voltage drops falls within a range (e.g., 0.85–1.0 volts) or a percentage, for example. If a fuel cell or multiple fuel cells in fuel cell stack 32 (FIG. 1) do not meet this criteria, the cells would be considered "dropped out" as is known in the art. Since such cells would not be producing sufficient electricity relative to other cells, the stack would fail the test. A failing result causes a report to be printed, or a message to be communicated by computing unit 10 (FIG. 1) to the operator via display 40 (FIG. 1), or otherwise, regarding the test result and further testing to be avoided as in Step 132.

Figure 2:
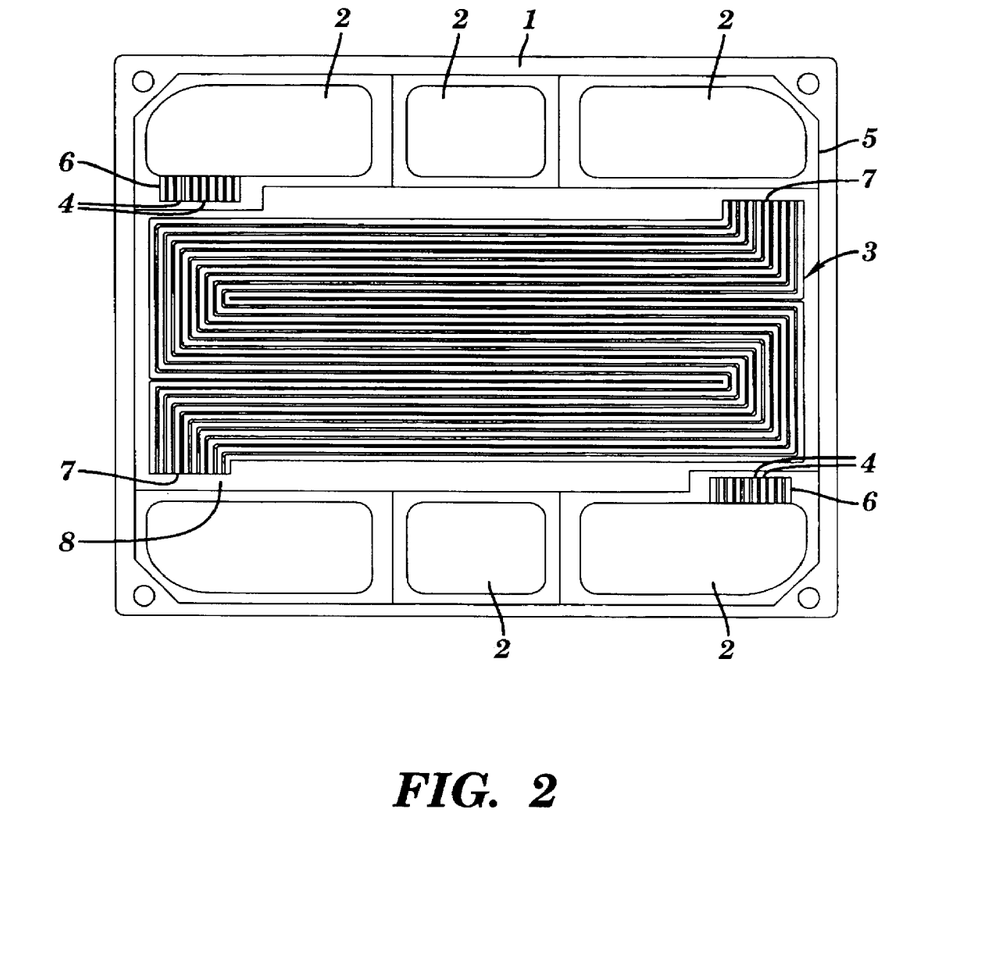
FIG. 2 is a depiction of a fluid flow plate having dive through holes.

If the open circuit voltage test is acceptable, the process proceeds to Step 135 in which a load or electrical demand is applied to the fuel cell stack. This test allows determining whether dive through holes were properly formed in the fluid flow plates. For example, as shown in FIG. 2, dive through holes, 4 and 7, are used to fluidly connect fluid flow manifolds 2 with their respective flow channels 3. Fluid flow plate 1 has a plurality of fluid flow manifolds 2, and a plurality of active area flow channels 3 located on each side of the fluid flow plate. In this example, the active area flow channels on the opposite side of fluid flow plate 1 (now shown in FIG. 2), are connected to fluid flow manifolds 2, by use of dive through holes 4 and inlet channels 6. Similarly, flow channels 3 are connected to fluid flow manifolds 2 by the use of dive through holes 7 and inlet channels located on the opposite side of fluid flow plate 1 (not shown in FIG. 2). The dive through holes extend through fluid flow plate 1 thereby allowing fluid from the fluid flow manifolds to enter the flow channels. The use of dive through holes, creates a smooth surface 8 on the fluid face plate thereby allowing a gasket 5 to aid in the sealing of one plate to another. Gasket 5 also aids in sealing the respective fluid manifolds, thereby preventing leaking of fluid.

With reference again to FIG. 3, the system is held for a period of time at a constant temperature in Step 140 and in Step 145 voltage drops across at least two fuel cells are measured. The drops are compared to predetermined criteria to determine whether the fluid flow plates of fuel cell stack 32 (FIG. 1) have been correctly formed such that dive through holes 4 and 7 (FIG. 2), satisfactorily allow the gases to pass from a fluid flow manifold 2 (FIG. 2) to active area fluid flow channels 3 (FIG. 2). For example, the criteria might limit the allowed variation in fuel cell drop such that no fuel cells "drop out." If the test fails, a report is printed in Step 147, or an operator is informed in other ways, e.g. via a display, sounds, lights, etc., and testing is stopped. Alternatively, if the result of the test is favorable, testing continues with the load being reduced in Step 150.

In Step 155, carbon monoxide is added to the reactant gases and in Step 160 the load is again increased. The system is held at the same flow rates and temperature for a period of time in Step 170 and in Step 175 a voltage drop test is performed. The membranes utilized in the fuel cells may be platinum on one side and a platinum-ruthenium alloy on the opposite side. Alternatively, membranes and catalysts may be formed of different materials, as is known by those skilled in the art. The introduction of carbon monoxide allows this test to determine if any of the membranes have been installed backwards. Correct installation calls for the membranes to be installed such that the platinum-ruthenium portion faces the reformate portion of a flow channel of a fuel cell. Platinum is not tolerant of carbon monoxide and thus if a membrane was installed backwards the interaction of the carbon monoxide and platinum would cause a voltage drop that would indicate that a membrane has been installed incorrectly. Carbon monoxide attaches itself to the platinum catalyst and prevents an electricity producing reaction from occurring thus causing a particular fuel cell to "drop out." Such a test may be performed in Step 175 and the result may be compared to predefined criteria. A failed test results in a report being created and the testing being stopped in Step 165.

If the fluid flow plates are determined to be installed correctly, e.g., if there are no membranes which are reversed, then the flow of carbon monoxide is stopped and the reactant gases provided are altered to include hydrogen, nitrogen, and perhaps carbon dioxide in Step 180. A new data logging rate may be set in Step 185 and the flow rate of reactant gases and desired temperatures of the gases and coolant are set in Step 190. The flow rate of the gases is set at a level which mimics minimum power output for fuel cell stack 32 (FIG. 1) and thus a low current density. A second load is applied in Step 195 also to mimic low electrical demand and the system is run at constant parameters for a period of time in Step 200. A voltage drop test is performed in Step 205 to insure that all the fuel cells are producing electricity at the new load and flow rates of the reactant gases. Results of the test are compared by computing unit 10 to predetermined criteria and a report is created or the operator is otherwise informed if fuel cell stack 32 (FIG. 1) fails the test at Step 210.

If fuel cell stack 32 (FIG. 1) passes this test, then in Step 250 the flow rate is changed and the reactant gas mixture is changed to consist of substantially pure hydrogen and incubation is performed in Step 299, as is known by those skilled in the art. Incubation can be performed in several ways and an exemplary incubation process is described in co-pending U.S. patent application Ser. No. 09/694,768, entitled "Method of Pre-Conditioning of Fuel Cell Stacks for Short Incubation", and filed Oct. 23, 2000; U.S. Pat. No. 6,576,356, the entire contents of this application is incorporated herein by reference.

Following incubation, the reactant gas mixture is changed, regulated, or altered to include hydrogen, nitrogen, carbon monoxide and optionally carbon dioxide, in Step 300. The flow rate is changed in Step 310 and the load is changed in Step 320 to mimic actual full scale operating conditions. The system is run at these parameters for a period of time to equilibrate the system in Step 330 and in Step 340 a voltage drop test is performed. Computing unit 10 (FIG. 1) compares the result of this test to predetermined criteria to determine if the voltage drops of the individual fuel cells are satisfactory, for example, to determine if they are within an accepted range. Also, the average fuel cell voltage drop is determined and it is compared by computing unit 10 (FIG. 1) to a predetermined criteria, for example a power output requirement or, to determine if overall performance of fuel cell stack 32 (FIG. 1) is satisfactory. If the results compare favorably then computing unit 10 (FIG. 1) may communicate a message to the operator via display 40 (FIG. 1) or print a report which indicates that fuel cell stack 32 (FIG. 1) has been qualified for use. In the alternative, if this test is failed, computing unit 10 (FIG. 1) may communicate a message to the operator, or print a report which indicates that fuel cell stack 32 (FIG. 1) has failed the test and is not qualified for use at Step 350.

An additional benefit of the present invention is that during the first several qualification tests described, fuel cell stack 32 (FIG. 1) is concurrently being warmed through the heating of the reactant gases and coolant prior to incubation. Testing mechanism 20 (FIG. 1) warms these gases and coolant, for example through a steam injection system. This permits immediate incubation of fuel cell stack 32 (FIG. 1) on completion of these initial tests if fuel cell stack 32 (FIG. 1) has passed all the pre-incubation tests. Since fuel cell stack 32 (FIG. 1) is already at the required temperature, it is not necessary to warm the gases and coolant prior to incubation which can require, e.g., up to thirty minutes to perform.

It will be appreciated by those skilled in the art that the present invention is applicable to testing the inverter, fuel processor, or other components or subsystems of the fuel cell system.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for enabling qualification of at least a portion of a fuel cell system, the method comprising:

electronically obtaining at least one result of a test of the at least a portion of a fuel cell system before incubation of the system;

electronically comparing the at least one result to at least one qualifying criteria; and     providing an indication before the incubation of the system that the fuel cell system is not functioning properly in response to the comparison.

2. The method of claim 1 further comprising setting the at least one qualifying criteria for the fuel cell system prior to the test.

3. The method of claim 1 wherein the providing the indication comprises at least one of displaying the indication on a display screen and printing the indication.

4. The method of claim 1 further comprising providing a testing mechanism couplable to the fuel cell system.

5. The method of claim 1 wherein the obtaining comprises obtaining a plurality of results of a plurality of tests of at least a portion of the fuel cell system.

6. The method of claim 5 wherein the comparing comprises comparing the plurality of results to a plurality of qualifying criteria.

7. The method of claim 1 wherein the at least one qualification criteria comprises a range of values.

8. The method of claim 1 wherein the at least a portion of a fuel cell system comprises a fuel processor.

9. The method of claim 1 wherein the at least a portion of a fuel cell system comprises an inverter.

10. The method of claim 1 wherein the at least a portion of a fuel cell system comprises a fuel cell stack.

11. The method of claim 1 wherein the at least a portion of a fuel cell system comprises a fuel cell stack, further comprising providing a supply of reactant gases substantially free of carbon monoxide to a fuel cell stack of the at least a portion of a fuel cell system.

12. The method of claim 11 further comprising regulating a temperature of the supply of reactant gases to the fuel cell stack.

13. The method of claim 11 wherein the test comprises performing an open circuit voltage test on a plurality of fuel cells of the fuel cell stack and wherein the at least one result comprises a measurement of a plurality of voltage drops.

14. The method of claim 13 wherein the comparing comprises comparing the measurement of a plurality of voltage drops to the at least one qualifying criteria.

15. The method of claim 14 further comprising providing at least one of an indication that reactant gases in the fuel cell stack are being distributed to all fuel cells of the fuel cell stack and an indication that the reactant gases are not being distributed to all the fuel cells based on the comparison of the plurality of measurements of voltage drops to the at least one qualifying criteria.

16. The method of claim 1 wherein the at least a portion of a fuel cell system comprises a fuel cell stack, further comprising providing a supply of reactant gases substantially free of carbon monoxide to a fuel cell stack of the at least a portion of a fuel cell system.

17. The method of claim 16 wherein the test comprises applying a load to the fuel cell stack and wherein the at least one result comprises a plurality of measurements of voltage drops across a plurality of fuel cells of the fuel cell stack.

18. The method of claim 17 wherein the comparing comprises comparing the plurality of measurements of voltage drops to the at least one qualifying criteria.

19. The method of claim 18 further comprising providing at least one of an indication that dive through holes in fluid flow plates in the fuel cell stack are properly formed and an indication that dive through holes are improperly formed based on the comparison of the plurality of measurements of voltage drops to the at least one qualifying criteria.

20. The method of claim 1 wherein the at least a portion of a fuel cell system comprises a fuel cell stack, the test comprising providing a supply of reactant gases, including carbon monoxide, to the fuel cell stack, applying a load to the fuel cell stack, and wherein the at least one result comprises a plurality of measurements of voltage drops across a plurality of fuel cells of the fuel cell stack.

21. The method of claim 20 wherein the comparing comprises comparing the plurality of measurements of voltage drops to the at least one qualifying criteria.

22. The method of claim 21 wherein the indication comprises an indication of an unsatisfactory installation of a membrane in at least one fuel cell of the fuel cell stack based on the comparison of the plurality of measurements of voltage drops to the at least one qualifying criteria.

23. The method of claim 1 wherein the at least a portion of a fuel cell system comprises a fuel cell stack, the test comprising providing a minimum flow rate of reactant gases, which are substantially free of carbon monoxide, to allow at least one of a plurality of fuel cells of the fuel cell stack to produce electricity, applying a load to the fuel cell stack, and wherein the at least one result comprises a plurality of measurements of voltage drops across a plurality of fuel cells of the fuel cell stack.

24. The method of claim 23 wherein the comparing comprises comparing the plurality of measurements of voltage drops to the at least one qualifying criteria.

25. The method of claim 24 further comprising providing an indication regarding relative electrical production among the plurality of fuel cells based on the comparison of the plurality of measurements of voltage drops to the at least one qualifying criteria.

26. A method for enabling qualification of a fuel cell stack, the method comprising:

electronically obtaining at least one measurement of voltage drop from an open circuit voltage test on a plurality of fuel cells of the fuel cell stack before incubation of the fuel cell stack;

electronically comparing the at least one measurement of voltage drop to a qualifying criteria; and providing an indication before incubation of the fuel cell stack that reactant gases in the fuel cell stack are at least one of being distributed to all fuel cells of the fuel cell stack and that the reactant gases are not being distributed to all of the fuel cells, based on the comparison of the at least one measurement of voltage drop to a qualifying criteria.

27. The method of claim 26 further comprising obtaining at least one result of a second test of at least a portion of the fuel cell system, and electronically comparing the at least one result of a second test to at least one second qualifying criteria.

28. The method of claim 27 wherein the first test is different from the second test.

29. The method of claim 28 further comprising providing an indication regarding qualification of the fuel cell system based on the comparison of the at least one result of a second test to the at least one second qualifying criteria.

30. The method of claim 29 wherein the providing the indication comprises at least one of providing an indication that the fuel cell system requires further testing, providing an indication that the fuel cell system is qualified, and providing an indication that the system is not qualified.

31. The method of claim 26 wherein a supply of reactant gases substantially free of carbon monoxide is supplied to the fuel cell stack.

32. A method for enabling qualification of a fuel cell stack, the method comprising:

applying a load to the fuel cell stack;

electronically obtaining at least one measurement of voltage drop from a voltage drop test across a plurality of fuel cells of the fuel cell stack before incubation of the fuel cell stack;

electronically comparing the at least one measurement of voltage drop of the voltage drop test to a qualifying criteria; and providing at least one of an indication regarding formation of dive through holes in fluid flow plates of the fuel cell stack are properly formed and an indication that the dive through holes are not properly formed, in response to the comparison of the at least one measurement of voltage drop of the voltage drop test to the qualifying criteria.

33. The method of claim 32 wherein a supply of reactant gases substantially free of carbon monoxide is supplied to the fuel cell stack.

34. A method for enabling qualification of a fuel cell stack, the method comprising:

applying a load to the fuel cell stack;

electronically obtaining at least one measurement of voltage drop from a voltage drop test across a plurality of fuel cells of the fuel cell stack;

electronically comparing the at least one measurement of voltage drop of the voltage drop test to a qualifying criteria; and providing at least one of an indication regarding installation of a membrane in at least one fuel cell of the fuel cell stack such that a cathode portion of the membrane faces a cathode portion of the at least one fuel cell and an anode portion of the membrane faces an anode portion of the at least one fuel cell and an indication that the membrane is improperly installed such that the cathode portion of the membrane does not face the cathode portion of the at least one fuel cell and the anode portion of the membrane does not face the anode portion of the at least one fuel cell, in response to the comparison of the at least one measurement of voltage drop of the voltage drop test to the qualifying criteria.

35. The method of claim 34 further comprising providing a supply of reactant gases including carbon monoxide to the fuel cell stack.

36. A method for enabling qualification of a fuel cell stack, the method comprising:

providing a flow rate of reactant gases to the fuel cell stack to mimic minimum power output for the fuel cell stack to produce electricity;

applying a load to the fuel cell stack to mimic low electrical demand, electronically obtaining at least one measurement of voltage drop from a voltage drop test across a plurality of fuel cells of the fuel cell stack;

electronically comparing the at least one measurement of voltage drop of the voltage drop test to a qualifying criteria; and providing at least one of an indication that all fuel cells of the fuel cell stack are adequately producing electricity and an indication that all of the fuel cells are not adequately producing electricity, in response to the comparison of the at least one measurement of voltage drop of the voltage drop test to the qualifying criteria.

37. The method of claim 36 further comprising providing a supply of reactant gases substantially free of carbon monoxide.

38. At least one program storage device readable by a machine, tangibly embodying at least one program of instructions executable by the machine to perform a method of qualifying at least a portion of a fuel cell system, said method comprising:

electronically obtaining at least one result of a test on the at least a portion of a fuel cell system before incubation of the system;

electronically comparing the at least one result to at least one qualifying criteria; and electronically indication before the incubation of the system the fuel cell system is not functioning properly in response to the comparison.

39. The at least one program storage device readable by a machine, tangibly embodying at least one program of instructions executable by the machine to perform a method of qualifying at least a portion of a fuel cell system of claim 38, wherein said method further comprises:

* * * * *

UNITED STATES PATENT AND TRADEMARK OFFICE
CERTIFICATE OF CORRECTION

PATENT NO. : 6,774,637 B2
DATED : August 10, 2004
INVENTOR(S) : Hallum et al.

It is certified that error appears in the above-identified patent and that said Letters Patent is hereby corrected as shown below:

Column 8,
Line 65, insert the word -- that -- after the word "indication"
Lines 65 and 66, delete the words "regarding formation of"

Column 9,
Line 17, delete the words "regarding installation of" after the word "indication", and insert -- that --
Line 18, insert the words -- is properly installed -- after the word "membrane"

Signed and Sealed this

Nineteenth Day of October, 2004

JON W. DUDAS
*Director of the United States Patent and Trademark Office*